US012618676B2

(12) United States Patent
Rose et al.

(10) Patent No.: US 12,618,676 B2
(45) Date of Patent: May 5, 2026

(54) AERIAL VEHICLE TRACKING USING DYNAMIC ALEATORIC UNCERTAINTY

(71) Applicant: The Boeing Company, Arlington, VA (US)

(72) Inventors: Alyssa Bekai Rose, Chelmsford, MA (US); Trevor M. Houchens, Cambridge, MA (US); Lena M. Downes, Portland, ME (US); Charles L. Burks, Cambridge, MA (US); Sildomar T. Monteiro, Lexington, MA (US)

(73) Assignee: THE BOEING COMPANY, Arlington, VA (US)

( * ) Notice: Subject to any disclaimer, the term of this patent is extended or adjusted under 35 U.S.C. 154(b) by 64 days.

(21) Appl. No.: 18/824,220

(22) Filed: Sep. 4, 2024

(65) Prior Publication Data

US 2026/0063423 A1 Mar. 5, 2026

(51) Int. Cl.
*G01C 21/00* (2006.01)

(52) U.S. Cl.
CPC .................................. *G01C 21/005* (2013.01)

(58) Field of Classification Search
CPC .... G01C 21/005; G06V 10/255; G06V 20/80; G06V 10/16; G06V 20/52; G06V 20/53; G06V 20/56; G06V 10/40; G06T 1/00; B60W 50/0205; G07C 5/0808
See application file for complete search history.

(56) References Cited

U.S. PATENT DOCUMENTS

| | | | |
|---|---|---|---|
| 11,537,819 B1 | 12/2022 | Das et al. | |
| 2020/0044852 A1* | 2/2020 | Streit | G06N 3/082 |
| 2020/0387744 A1* | 12/2020 | Wang | G06F 18/22 |
| 2021/0082283 A1* | 3/2021 | Malla | G05B 13/027 |

(Continued)

OTHER PUBLICATIONS

Object View Prediction with Aleatoric Uncertainty for Robotic Grasping (Year: 2023).*

(Continued)

*Primary Examiner* — Fadey S. Jabr
*Assistant Examiner* — Faris Asim Shaikh
(74) *Attorney, Agent, or Firm* — MH2 Technology Law Group LLP

(57) ABSTRACT

Techniques for aerial vehicle tracking using dynamic aleatoric uncertainty covariance estimation are presented. The techniques include: obtaining an image depicting at least one aerial vehicle of interest; passing the image to a first machine learning subsystem, which provides at least one feature vector; inputting the at least one feature vector to a second machine learning subsystem, where the second machine learning subsystem is trained to provide detected aerial vehicle identification data sets (including respective aerial vehicle coordinates, respective aerial vehicle bounding box dimensions, and respective dynamic aleatoric uncertainty covariance values) corresponding to input feature vectors; providing at least one detected aerial vehicle identification data set to a recursive Bayesian estimator subsystem, from which at least one filtered set of aerial vehicle coordinates, representing a real-time location of a respective aerial vehicle of interest, is obtained; and outputting the at least one filtered set of aerial vehicle coordinates.

20 Claims, 5 Drawing Sheets

(56) References Cited

U.S. PATENT DOCUMENTS

| | | | | |
|---|---|---|---|---|
| 2021/0113143 A1* | 4/2021 | Grunsten | ............. | A61B 5/4082 |
| 2022/0092351 A1* | 3/2022 | Huang | .................... | G06N 3/09 |
| 2024/0029410 A1* | 1/2024 | Chen | ....................... | G06V 10/82 |
| 2024/0094726 A1* | 3/2024 | Katz | .................... | G05D 1/0055 |
| 2024/0394506 A1* | 11/2024 | Chiu | ....................... | G06N 3/042 |
| 2025/0076852 A1* | 3/2025 | Look | ....................... | G06N 3/045 |
| 2025/0299458 A1* | 9/2025 | Monari | ................. | G06V 10/25 |

OTHER PUBLICATIONS

Ding et al., "Capture Uncertainties in Deep Neural Networks for Safe Operation of Autonomous Driving Vehicles," 2021 IEEE International Conference on Parallel & Distributed Processing with Applications, Big Data & Cloud Computing, Sustainable Computing & Communications, Social Computing & Networking (ISPA/BDCloud/SocialCom/SustainCom), 2021, pp. 826-835.

Extended European Search Report for European Application No. 25178574.7 dated Aug. 27, 2025, 11 pages.

Amini et al., "Deep Evidential Regression," 34th Conference on Neural Information Processing Systems part of Advances in Neural Information Processing Systems 33 (NeurIPS 2020), 11 pages.

Meinert et al., "Multivariate Deep Evidential Regression," arXiv:2104.06135v4 [cs.LG] Feb. 24, 2022, 20 pages.

Gasperini et al., "CertainNet: Sampling-free Uncertainty Estimation for Object Detection," IEEE Robotics and Automation Letters, Dec. 28, 2021, 8 pages.

Nallapareddy et al., "EvCenterNet: Uncertainty Estimation for Object Detection Using Evidential Learning," arXv:2303.03037v2 [cs.CV] Sep. 28, 2023, 8 pages.

Russell et al., "Multivariate Uncertainty in Deep Learning," arXiv:1910.14215v2 [cs.LG] Jun. 14, 2021, 8 pages.

* cited by examiner

Image Frame $u$

Velocity $u_t$

Centroid $v$ $v_t$

Target $t$

Covariance Ellipsoid
(Aleatoric Uncertainty)

Bounding Box
Confidence %
Class %

100

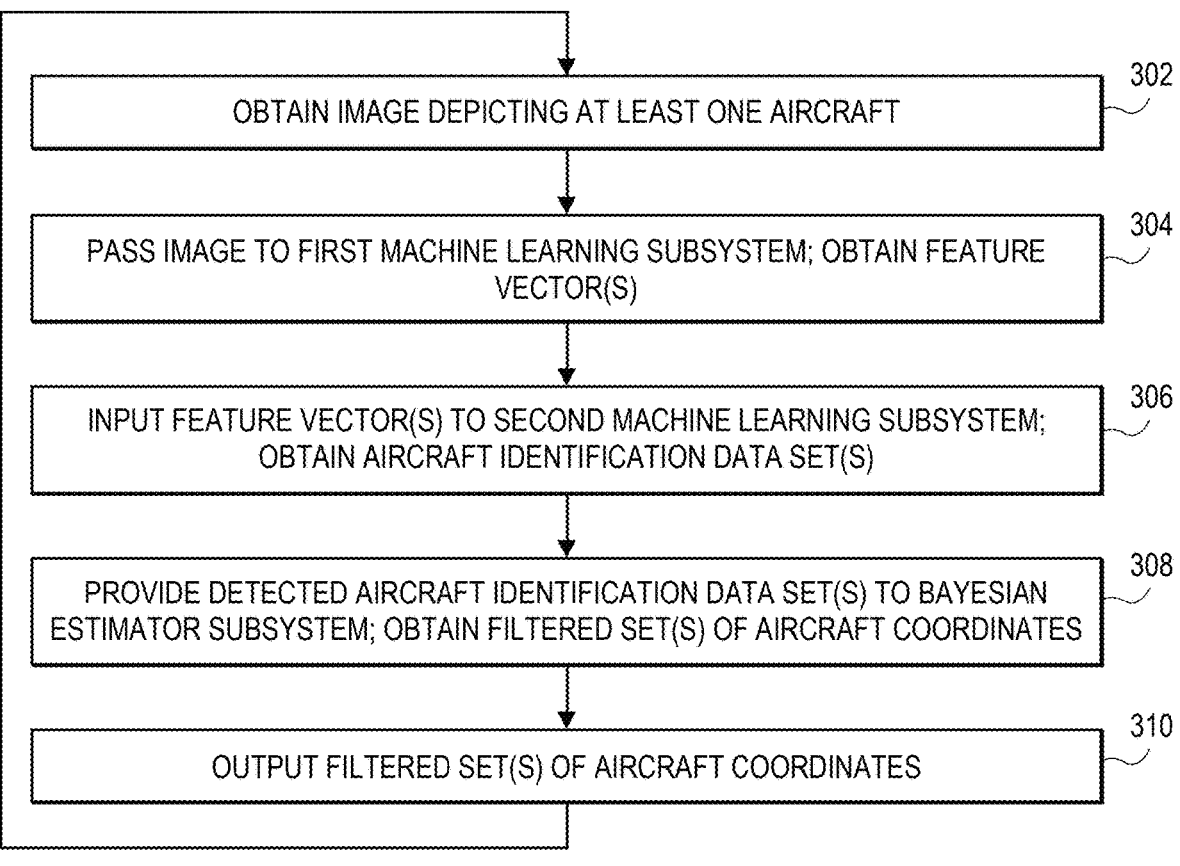

302 — OBTAIN IMAGE DEPICTING AT LEAST ONE AIRCRAFT

304 — PASS IMAGE TO FIRST MACHINE LEARNING SUBSYSTEM; OBTAIN FEATURE VECTOR(S)

306 — INPUT FEATURE VECTOR(S) TO SECOND MACHINE LEARNING SUBSYSTEM; OBTAIN AIRCRAFT IDENTIFICATION DATA SET(S)

308 — PROVIDE DETECTED AIRCRAFT IDENTIFICATION DATA SET(S) TO BAYESIAN ESTIMATOR SUBSYSTEM; OBTAIN FILTERED SET(S) OF AIRCRAFT COORDINATES

310 — OUTPUT FILTERED SET(S) OF AIRCRAFT COORDINATES

AERIAL VEHICLE TRACKING USING DYNAMIC ALEATORIC UNCERTAINTY

GOVERNMENT SUPPORT

This invention was made with government support under HR00112290107 awarded by Defense Advanced Research Projects Agency. The government has certain rights in the invention.

FIELD

This disclosure relates generally to tracking objects, such as terrestrial or aerial vehicles.

BACKGROUND

Object detection is a common sub-problem for autonomous systems that rely on computer vision. State-of-the-art object detectors often employ a single stage architecture that uses a single pass of input data to produce bounding boxes for objects within an input image. Due to the computational efficiency of single-pass detectors, they are widely used for perceiving the environment in real-time applications, including in autonomous vehicle perception systems. However, while existing single-pass detectors are computationally efficient, they do not provide a measure of their uncertainty. For example, these techniques often do not provide aleatoric uncertainty estimates of noise originating from input sensors.

Deep neural network (DNN)-based object detectors are sometimes used in perception systems. However, DNNs generally lack the ability to provide explanations of their inner workings or reliable quantitative measures of uncertainty. This limits their ability to be combined with other modules within larger decision-making systems.

Some attempts to include uncertainty estimation with DNNs, such as Bayesian neural networks, ensemble methods, and Monte Carlo dropout methods, involve some form of sampling, which is computationally expensive. Here, sampling refers to multiple passes of an input datum through a DNN. A first type of sampling involves repeatedly perturbing and passing an input datum through a DNN. A second type of sampling involves passing an input datum through many slightly different DNNs. Both types of sampling consume excessive power, with the first type also consuming excessive time and the second type also requiring an excessive processing footprint. Models deployed in the real world, where uncertainty estimation is most crucial, often require algorithms to run in real-time on small-footprint and low-power hardware. These constraints make sampling-heavy approaches impractical.

Other attempts to integrate uncertainty estimation with DNNs, such as Gaussian neural networks, are inherently inaccurate and too slow for real-time tracking of high-speed objects.

Yet other attempts to integrate uncertainty estimates with DNNs, such as loss attenuation, redundancy, and Gaussian Density Models, provide only the overall variance of the model outputs, and therefore cannot capture the full aleatoric uncertainty covariance matrices of output location and bounding box dimensions in object tracking applications, for example.

Attempts to provide single-stage architecture with uncertainty estimation for object detection also fall short. For example, CertainNet (Gasperini, et al., "Certainnet: Sampling-free uncertainty estimation for object detection," IEEE Robotics and Automation Letters, vol. 7, no. 2, p. 698-705) extends the CenterNet object detector by estimating uncertainty in a single pass with the deterministic uncertainty quantification (DUQ) method. However, the DUQ method is computationally expensive and does not directly model regression uncertainties. EvCenterNet (Nallapareddy, et al., "EvCenterNet: Uncertainty estimation for object detection using evidential learning," in 2023 IEEE/RSJ International Conference on Intelligent Robots and Systems (IROS)), also an extension of CenterNet, uses evidential learning to estimate classification and regression uncertainties. However, EvCenterNet follows the univariate normal inverse-gamma (NIG) distribution of and hence treats the bounding box width and height as independent variances. Statistics-based estimators like the linear Kalman filter require the full covariance of dependent variables, which cannot be provided by univariate approaches to uncertainty estimation. In general, prior art techniques that utilize static (fixed) univariate uncertainty estimations with statistics-based estimators like Kalman filters produce inaccurate results, particularly in the presence of variable or heteroskedastic noise levels.

SUMMARY

According to various embodiments, a method of aerial vehicle tracking using dynamic aleatoric uncertainty covariance estimation is provided. The method includes: obtaining an image depicting at least one aerial vehicle of interest; passing the image to a first machine learning subsystem, from which at least one feature vector is obtained, wherein the first machine learning subsystem is trained with a first training corpus comprising a set of labeled images, wherein a respective labeled image comprises a respective image and a respective label; inputting the at least one feature vector to a second machine learning subsystem, wherein the second machine learning subsystem is trained with a second training corpus comprising a set of labeled feature vectors, wherein a respective labeled feature vector comprises a respective feature vector, respective centroid coordinates, and respective bounding box dimensions, wherein the second machine learning subsystem is trained based on a loss to provide detected aerial vehicle identification data sets corresponding to input feature vectors, wherein the loss comprises (1) a regression loss for aerial vehicle coordinates and aerial vehicle bounding box dimensions, and (2) a Gaussian loss for aleatoric uncertainty, and wherein a respective detected aerial vehicle identification data set comprises: respective aerial vehicle coordinates, respective aerial vehicle bounding box dimensions, and respective dynamic aleatoric uncertainty covariance values; providing at least one detected aerial vehicle identification data set, output from the second machine learning subsystem in response to the inputting, to a recursive Bayesian estimator subsystem, from which at least one filtered set of aerial vehicle coordinates is obtained, wherein the recursive Bayesian estimator subsystem assigns a respective detected aerial vehicle identification data set to a respective Bayesian estimator, from which a respective filtered set of aerial vehicle coordinates is obtained, wherein a respective filtered set of aerial vehicle coordinates represent a real-time location of a respective aerial vehicle of interest; and outputting the at least one filtered set of aerial vehicle coordinates.

Various optional features of the above method embodiments include the following. Respective dynamic aleatoric uncertainty covariance values may be obtained from a single pass of a respective feature vector through the second machine learning subsystem. Respective dynamic aleatoric uncertainty covariance values may include at least one of: a respective covariance matrix for respective aerial vehicle coordinates, or respective aerial vehicle bounding box dimensions. The second machine learning subsystem may include a multivariate deep evidential regression network. The Gaussian loss may include a trace of a log-Cholesky decomposition of a matrix representing dynamic aleatoric uncertainty covariance values. A respective detected aerial vehicle identification data set may further include an aerial vehicle classification label. A respective Bayesian estimator may include a respective Kalman filter. The recursive Bayesian estimator subsystem may be configured to provide a respective Kalman filter for each of a plurality of aerial vehicles of interest detected in the image. The first machine learning subsystem may include a convolutional neural network and a multiscale feature decoder. Respective filtered aerial vehicle bounding box dimensions may be obtained from the respective Bayesian estimator, and the outputting may further include outputting at least one set of filtered aerial vehicle bounding box dimensions.

According to various embodiments, a system for aerial vehicle tracking using dynamic aleatoric uncertainty covariance estimation is provided. The system includes: a non-transitory computer readable medium comprising instructions; and at least one electronic processor that executes the instructions to perform operations comprising: obtaining an image depicting at least one aerial vehicle of interest; passing the image to a first machine learning subsystem, from which at least one feature vector is obtained, wherein the first machine learning subsystem is trained with a first training corpus comprising a set of labeled images, wherein a respective labeled image comprises a respective image and a respective label; inputting the at least one feature vector to a second machine learning subsystem, wherein the second machine learning subsystem is trained with a second training corpus comprising a set of labeled feature vectors, wherein a respective labeled feature vector comprises a respective feature vector, respective centroid coordinates, and respective bounding box dimensions, wherein the second machine learning subsystem is trained based on a loss to provide detected aerial vehicle identification data sets corresponding to input feature vectors, wherein the loss comprises (1) a regression loss for aerial vehicle coordinates and aerial vehicle bounding box dimensions, and (2) a Gaussian loss for aleatoric uncertainty, and wherein a respective detected aerial vehicle identification data set comprises: respective aerial vehicle coordinates, respective aerial vehicle bounding box dimensions, and respective dynamic aleatoric uncertainty covariance values; providing at least one detected aerial vehicle identification data set, output from the second machine learning subsystem in response to the inputting, to a recursive Bayesian estimator subsystem, from which at least one filtered set of aerial vehicle coordinates is obtained, wherein the recursive Bayesian estimator subsystem assigns a respective detected aerial vehicle identification data set to a respective Bayesian estimator, from which a respective filtered set of aerial vehicle coordinates is obtained, wherein a respective filtered set of aerial vehicle coordinates represent a real-time location of a respective aerial vehicle of interest; and outputting the at least one filtered set of aerial vehicle coordinates.

Various optional features of the above system embodiments include the following. Respective dynamic aleatoric uncertainty covariance values may be obtained from a single pass of a respective feature vector through the second machine learning subsystem. Respective dynamic aleatoric uncertainty covariance values may include at least one of: a respective covariance matrix for respective aerial vehicle coordinates, or respective aerial vehicle bounding box dimensions. The second machine learning subsystem may include a multivariate deep evidential regression network. The Gaussian loss may include a trace of a log-Cholesky decomposition of a matrix representing dynamic aleatoric uncertainty covariance values. A respective detected aerial vehicle identification data set may further include an aerial vehicle classification label. A respective Bayesian estimator may include a respective Kalman filter. The recursive Bayesian estimator subsystem may be configured to provide a respective Kalman filter for each of a plurality of aerial vehicles of interest detected in the image. The first machine learning subsystem may include a convolutional neural network and a multiscale feature decoder. Respective filtered aerial vehicle bounding box dimensions may be obtained from the respective Bayesian estimator, and the outputting may further include outputting at least one set of filtered aerial vehicle bounding box dimensions.

Combinations, (including multiple dependent combinations) of the above-described elements and those within the specification have been contemplated by the inventors and may be made, except where otherwise indicated or where contradictory.

BRIEF DESCRIPTION OF THE DRAWINGS

Various features of the examples can be more fully appreciated, as the same become better understood with reference to the following detailed description of the examples when considered in connection with the accompanying figures, in which:

FIG. 3 is a schematic diagram of a method of object tracking using dynamic aleatoric uncertainty covariance estimation, according to some embodiments.

DESCRIPTION OF THE EXAMPLES

Figure 1:
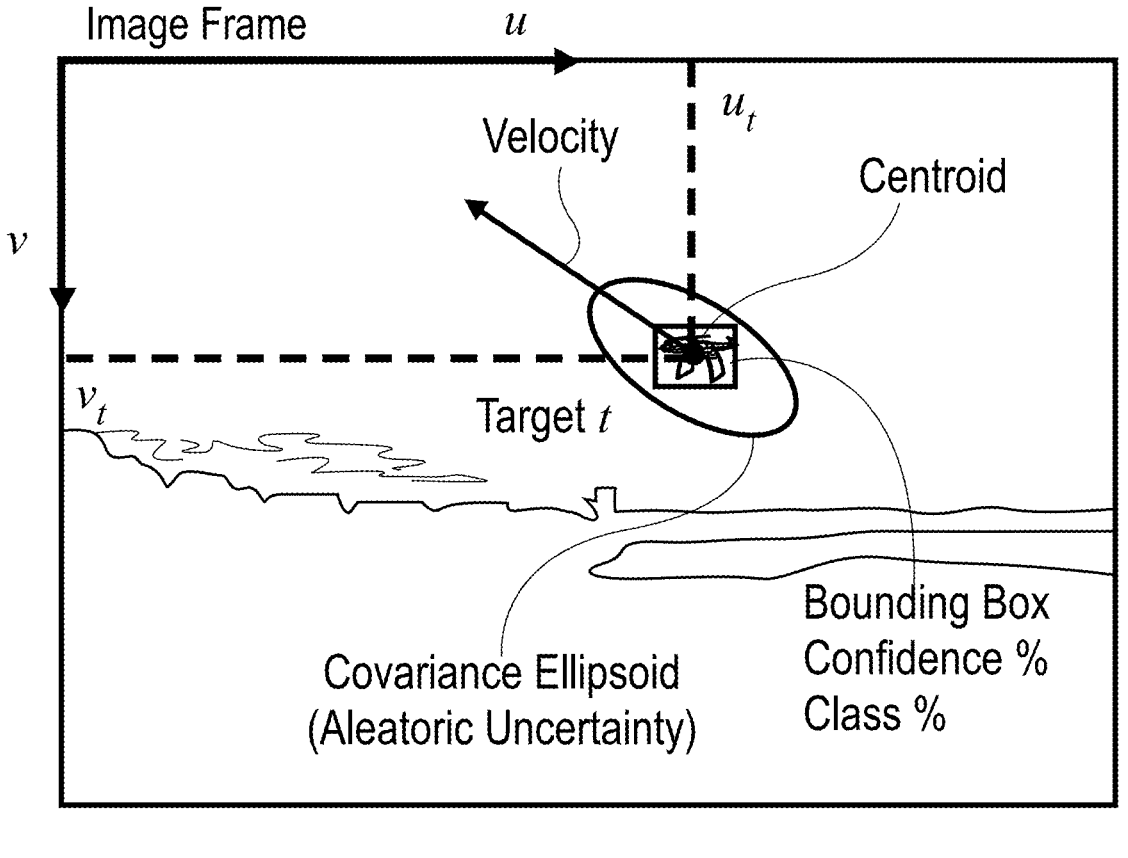
FIG. 1 illustrates object tracking with full aleatoric uncertainty covariance of object location and bounding box dimensions.

Reference will now be made in detail to example implementations, illustrated in the accompanying drawings. Wherever convenient, the same reference numbers will be used throughout the drawings to refer to the same or like parts. In the following description, reference is made to the accompanying drawings that form a part thereof, and in which is shown by way of illustration specific exemplary examples in which the invention may be practiced. These examples are described in sufficient detail to enable those skilled in the art to practice the invention and it is to be understood that other examples may be utilized and that changes may be made without departing from the scope of the invention. The following description is, therefore, merely exemplary.

Some embodiments provide object (e.g., aerial vehicle) tracking using DNNs that account for and explicitly represent environmental covariance information. Some embodiments provide novel machine learning systems that include such DNNs composed in a hierarchical fashion with statistics-based estimation chains, such as Kalman filters. Some embodiments provide for multi-object tracking, which specifically benefits from integration with statistics-based estimation and accurate measurement covariance. Some embodiments use a modification of Deep Evidential Regression (DER), an approach to evidential deep learning (EDL) uncertainty estimation, that calculates well-calibrated uncertainties from a single pass of an input datum through a DNN, providing scalable uncertainty estimates without the need for resource-intensive sampling. In particular, some embodiments train a DNN using a multivariate Gaussian loss function, which trains a machine learning subsystem to provide full aleatoric covariance matrices for the output of an object detector with only a single forward pass of an input datum.

Some embodiments overcome the disadvantages of known object detectors that lack the ability to provide reliable quantitative measures of uncertainty, which reduces their reliability in safety-critical applications and hinders their ability to integrate with other modules within larger estimation or decision-making systems. Further, some embodiments overcome the disadvantages of prior art approaches that only provide variances for the output variables and therefore fail to generalize to more complex multi-sensor or multi-dimensional problem domains, which require the consideration of full aleatoric uncertainty covariance values. Some embodiments solve the aforementioned problems of the prior art through the use of a machine learning subsystem that is trained using a Gaussian loss for aleatoric uncertainty and thus provides full aleatoric uncertainty covariance values for the coordinates and bounding box dimensions of detected objects. Further, some embodiments solve the disadvantages of prior art, such as inaccurate Gaussian mixture neural networks, by providing dynamic aleatoric uncertainty covariance estimates without reducing the accuracy of a machine learning subsystem that performs object classification. Yet further, some embodiments solve the aforementioned disadvantages of the prior art by passing the full aleatoric uncertainty covariance matrices to a recursive Bayesian estimator subsystem, which uses the dynamic aleatoric uncertainty values to filter out noise in real time.

These and other features and advantages are shown and described herein in reference to the figures.

FIG. 1 illustrates object tracking 100 with full aleatoric uncertainty covariance of object location and bounding box dimensions, according to some embodiments. Thus, FIG. 1 depicts an image that shows a target object. To set forth a pixel space in which locations and dimensions within the image may be identified quantitatively, axes u and v are imposed on the image, with the origin in the upper left corner, by way of non-limiting example. The object is tracked by automatically determining the coordinates $(u_t, v_t)$ in the pixel space of its centroid and the dimensions (width×height) of a bounding box about the object. The object tracking shown in FIG. 1 also depicts a covariance ellipsoid illustrating the aleatoric uncertainty of the object's estimated coordinates $(u_t, v_t)$.

In general, covariance measures the joint variability of two or more variables that each include some amount of randomness, such as noise. Due to the object's velocity and the inherent noise in sensors that capture images and tracking a moving object between image frames, the object's estimated coordinates $(u_t, v_t)$ are uncertain. Moreover, the uncertainties of the individual components of the object's estimated coordinates, as well as the individual components of the object's bounding box, vary with each-other. That is, there is non-zero covariance between these parameters. According to some embodiments, a covariance matrix may provide a summary of the covariance between the four parameters that include the object's centroid coordinates (e.g., $(u_t, v_t)$ in pixel space) and bounding box dimensions (e.g., width×height).

Note that embodiments may track one or more objects without explicitly displaying the objects' centroid and bounding box as presented for the sake of illustration in FIG. 1.

Figure 2A:
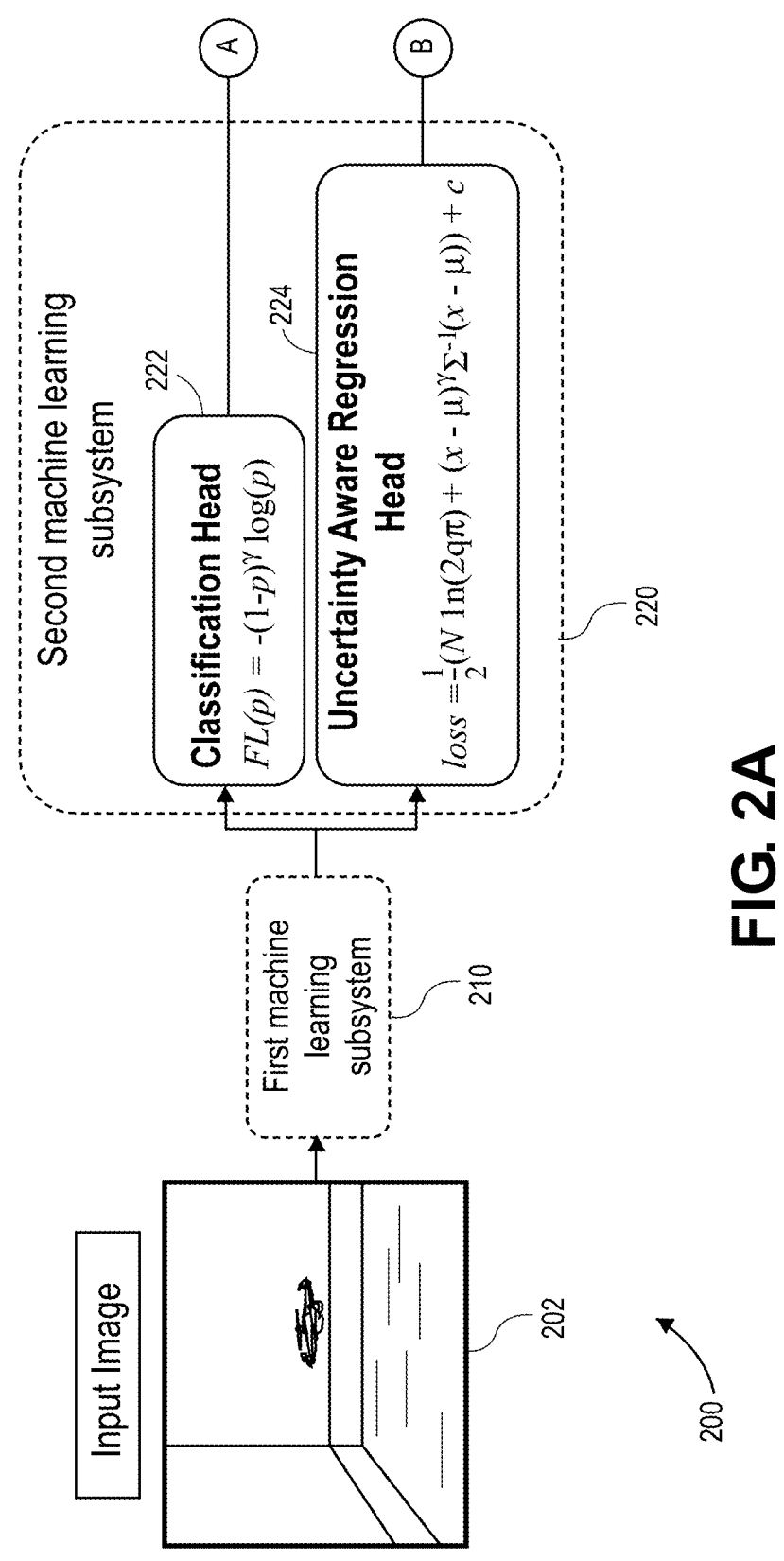
FIGS. 2A, 2B, and 2C depict a schematic diagram of a system for object tracking using dynamic aleatoric covariance uncertainty estimation, according to some embodiments.
Figure 2B:
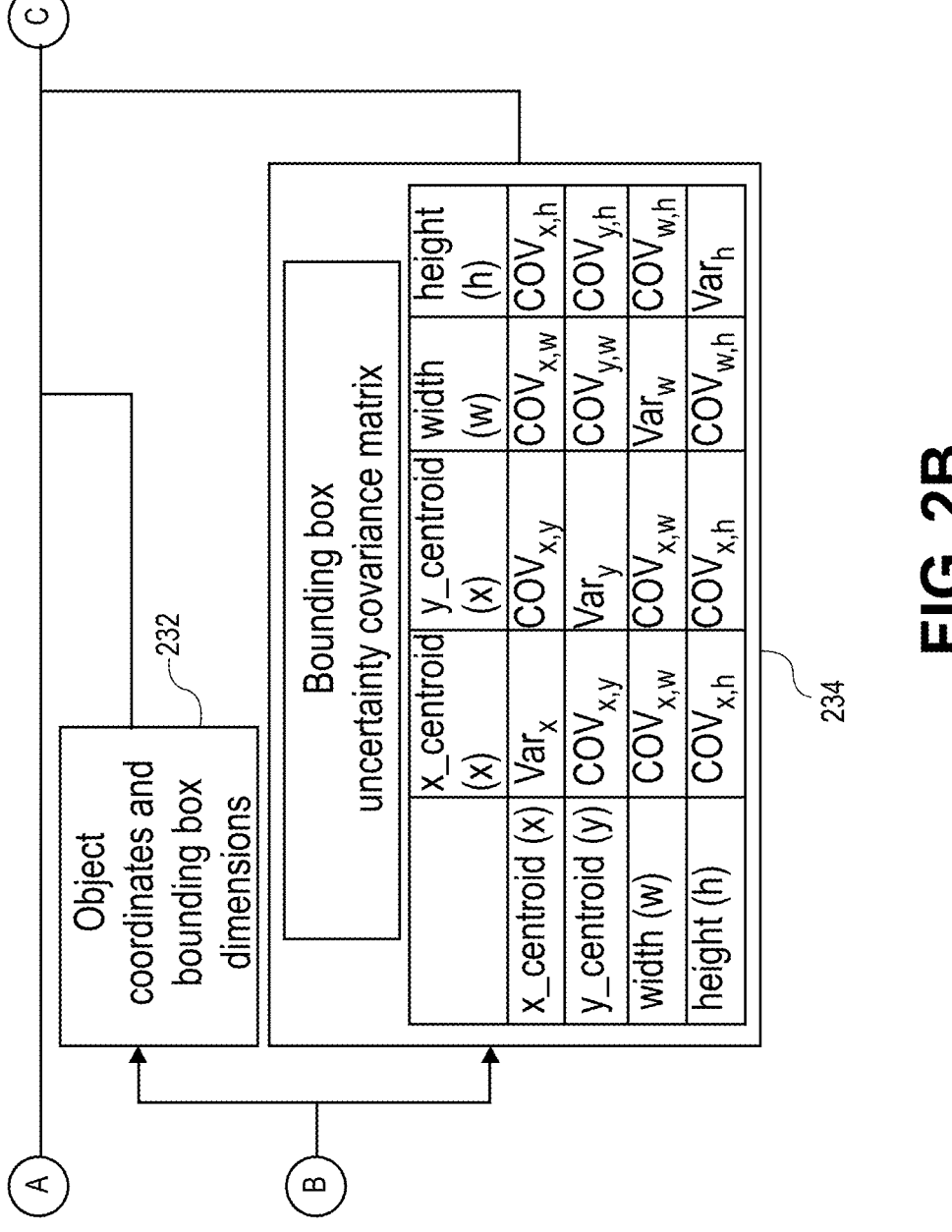
Figure 2C:
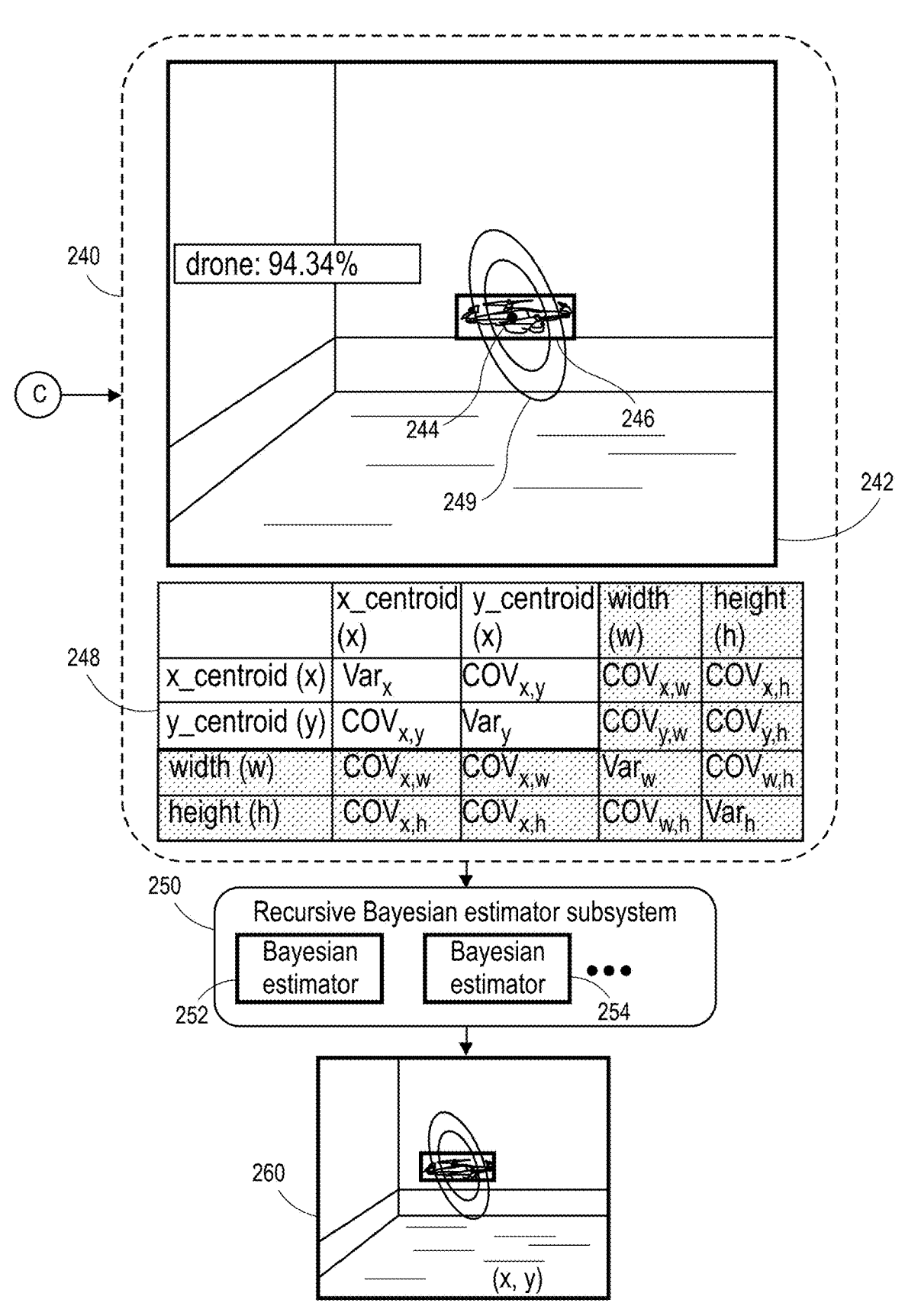

FIGS. 2A, 2B, and 2C depict a schematic diagram of a system 200 for object tracking using dynamic aleatoric uncertainty covariance estimation, according to some embodiments. The system 200 may be implemented using a video image sensor and one or more electronic processors. The video image sensor may be a visible light video camera, an infrared video camera, or a synthetic aperture radar (SAR) sensor, by way of non-limiting examples. One or more objects, such as one or more aerial vehicles (e.g., aircraft, airplanes, drones, rockets, etc.) may be tracked. The object(s) may be tracked in a sequence of images 202, such as are provided by the video image sensor. Each image 202 acquired by the video image sensor is provided to a first machine learning subsystem 202 and subsequently processed as described presently.

The first machine learning subsystem 210 performs feature extraction, deriving one or more feature vectors from the image 202. The first machine learning subsystem 210 may be implemented using single-stage architecture. The first machine learning subsystem 210 may include a convolutional neural network, such as an EfficientNet DNN, which uses compound scaling to scale model dimensions while maintaining accuracy. The EfficientNet DNN derives an intermediate feature vector from the image 202, which, by way of non-limiting examples, is passed to a bi-directional feature pyramid neural network (BiFPN) within the first machine learning subsystem 210. The BiFPN aids in the detection of features at different scales within an image. The first machine learning subsystem thus provides one or more feature vectors, e.g., from the BiFPN or directly from the convolutional neural network, to a second machine learning subsystem 220. Note that embodiment are not limited to the use of convolutional neural networks for the first machine learning subsystem 210. For example, according to some embodiments, the first machine learning subsystem 210 may utilize a transformer DNN for feature detection.

The second machine learning subsystem 220 includes both a classification head 222 and a regression head 224. The classification head 222 and the regression head 224 are trained together using respective loss functions as described presently.

The classification head 222 may be implemented as a classifier and may use an associated classification loss $(\text{loss}_{classification})$ to train the second machine learning subsystem 222 to predict class labels and class scores (likelihood that the object belongs to the class). The classification loss may be implemented as a focal loss, which may be represented as follows, by way of non-limiting example:

$$\text{loss}_{classification} = -\alpha(1-p)^\gamma \log(p) \tag{1}$$

In Equation (1), the classification loss is for a class prediction p, and parameters $\alpha$ and $\gamma$ may be selected as 0.25 and 2.0, respectively, by way of non-limiting example.

Thus, the classification head 220 ingests the high-level features provided by the first machine learning subsystem 210 to perform object classification based on a classification loss function $(\text{loss}_{classification})$. This determines what type of objects exist in the input image, and the probability that the objects belong to those particular class types.

The regression head 224 separately ingests the high-level features provided by the first machine learning subsystem 210. It uses an associated regression loss (loss$_{regression}$) to train the second machine learning subsystem 220 to predict centroid coordinates and bounding box dimensions for each object instance within the input image 202.

The regression head 224 also uses an associated multivariate Gaussian loss (loss$_{Gaussian}$) to train the second machine learning subsystem 220 to predict aleatoric uncertainty covariance values. The regression head 224 may implement multivariate deep evidential regression to output predicted full aleatoric uncertainty covariance matrices. Each object instance within the object detection data training corpus used to train the second machine learning subsystem 220 is labeled with associated ground truth target coordinates and bounding box dimensions (collectively, y). During training, the regression head 224 outputs a predicted bounding box μ and an aleatoric uncertainty covariance matrix Σ (or equivalent lower triangular aleatoric uncertainty covariance matrix Σ$_{tril}$) for each object instance. A non-limiting example multivariate Gaussian loss for the N dimensional aleatoric uncertainty covariance matrix Σ is shown in Equation (2).

$$\text{loss}_{Gaussian} = \frac{1}{2}\left(N \ln(2\pi) + (y - \mu)^T {\sum}^{-1} (y - \mu)\right) + C \tag{2}$$

In Equation (2), the term C represents the trace of the log-Cholesky decomposition of Σ, which satisfies constraints requiring Σ to be symmetric and positive definite and allows for more stable gradient descent during training. Thus, the Gaussian loss according to some embodiments may include a trace of a log-Cholesky decomposition of a matrix representing dynamic aleatoric uncertainty covariance values.

In operation, the regression head outputs centroid coordinates and bounding box dimensions 232, and a full 4×4 aleatoric uncertainty covariance matrix 234 summarizing the covariances of the coordinates and bounding box dimensions, for each detected object.

The second machine learning subsystem 220 is trained using a total loss function, which includes the classification loss (loss$_{classification}$) of the classification head 222 as well as the regression loss (loss$_{regression}$) and Gaussian loss (loss$_{Gaussian}$) of the regression head 224. The total loss may be represented as shown in Equation (3), by way of non-limiting example.

$$\text{loss} = \text{loss}_{classification} + \text{loss}_{regression} + \text{loss}_{Gaussian} \tag{3}$$

The final outputs 240 of the second machine learning subsystem 220 include, for each detected object: (A) a class label and class score output from the classification head 222, and (B) object coordinates and bounding box dimensions as well as an aleatoric uncertainty covariance matrix output from the regression head 224. For purposes of illustration rather than limitation, FIG. 2C includes a display 242 showing centroid coordinates 244 of, and a bounding box 246 around, an example object, together with its class score (drone: 94.34%). Also for purposes of illustration rather than limitation, FIG. 2C graphically depicts a subset of the aleatoric uncertainty covariance matrix 248 as three nested ellipses 249 representing three standard deviations. Specifically, the non-greyed-out portions of the aleatoric uncertainty covariance matrix 248 (namely, the 2×2 uncertainty of the bounding box center position) is illustrated by the ellipses 249.

To summarize the second machine learning subsystem 220, the output of the first machine learning subsystem 210 serves as input to both the classification head 222 and regression head 224 within the second machine learning subsystem 220. Once trained, the classification head 222 and regression head 224 operate independently of each other, and do not interact. The multivariate Gaussian loss function (Equation (2)) enhances functionality at the regression head 224 by augmenting the DNN with the ability to generate multivariate aleatoric uncertainty covariance matrix predictions summarized in the aleatoric uncertainty covariance matrix 234.

The final outputs 240 of the second machine learning subsystem 220 are passed as inputs to a recursive Bayesian estimator subsystem 250 as measurements. In particular, dynamic likelihoods (the measurement noise aleatoric uncertainty covariance matrices that are provided at each measurement update call) are output by the second machine learning subsystem 220 for each object detected within the image 202. Each matrix summarizes the aleatoric uncertainty covariance values of respective centroid coordinates and bounding box dimensions of detected objects in the image 202. Use of dynamic likelihoods allows each measurement input to the second machine learning subsystem 220 to utilize a respective dynamic measurement noise aleatoric uncertainty covariance matrix corresponding specifically to the measurement, hence dynamic likelihoods are compatible with heteroskedastic uncertainties. The use of dynamic aleatoric uncertainty estimations provide superior tracking in comparison to systems that rely on static (fixed) uncertainty estimations.

In general, the Bayesian estimator subsystem 250 maintains an estimate and uncertainty on each object's position in the image across sequential frames. The Bayesian estimator subsystem 250 may include instantiations of Kalman filters (e.g., linear Kalman filters, extended Kalman filters, unscented Kalman filters, etc.), particle filters, or other statistical estimators. In particular, the Bayesian estimator subsystem 250 may spawn and maintain one or more instantiations of a Bayesian estimator (e.g., 252, 254), which may be individual Kalman filter implementations on one or more electronic processors. For purposes of illustration rather than limitation, a linear Kalman filter implementation of the second machine learning subsystem 250 is described presently.

In general, a linear Kalman filter has the following parameters: a state-transition model, an observation model, a process noise covariance matrix, and a measurement noise covariance matrix. According to various embodiments, the state transition model may include a linear transformation, the observation model may include a linear transformation, the process noise covariance matrix may be a user-configurable parameter, and the measurement noise covariance matrix may include the aleatoric uncertainty covariance matrix 234 dynamically provided by the regression head 224 at each time step. The observed measurement may include the output of the regression head 224 (which provides the centroid coordinates).

According to some embodiments, the Hungarian method is used to associate multiple object detections with the appropriate existing instantiations of Bayesian estimators (e.g., 252, 254); they are either assigned to one of the existing object Kalman filter tracks or a new Kalman filter track is spawned if a detection is otherwise inconsistent. Each Kalman filter takes in the centroid of a predicted bounding box and its aleatoric uncertainty covariance matrix and outputs a noise-filtered state estimate, which includes the current estimate of the object's location and velocity and the current uncertainty in those estimates, e.g., in the form of a covariance matrix. The 2D Euclidean distance between measured centroid coordinates and centroid coordinates predicted by the Kalman filter is used to populate the cost matrix for the Kalman filter. The number of consecutively detected frames combined with the detected class of the object provides a heuristic proxy for track maturity and track exit logic.

Note that the regression head 224 of the second machine learning subsystem 110 produces both the centroid coordinates of each object and the associated covariance matrix, which the Kalman filters use as the Kalman filter measurement noise covariance matrix to accurately track the objects. This is superior to systems that only accommodate outputting either the centroid coordinates, or just the one coordinate of the centroid and once uncertainty (e.g., variance), which limits integration options with a Kalman filter.

The system 200 may operate iteratively, with an input image (such as image 202) acquired and processed at each time step in real time. At each time step, the Bayesian estimator subsystem 260 of the system 200 outputs noise-filtered sets of object coordinates representing real-time locations of each object in the input images, and control reverts to 202.

FIG. 3 is a schematic diagram of a method 300 of object tracking using dynamic aleatoric covariance uncertainty estimation, according to some embodiments. The method 300 may be used for tracking any of a variety of objects, such as aerial vehicles, terrestrial vehicles, aquatic vehicles, or other objects in motion capable of appearing in images. The method 300 may be implemented using a system, such as the system 200 shown and described herein in reference to FIGS. 2A, 2B, and 2C. One object, or a plurality of objects, may be tracked according to the method 300.

At 302, the method 300 includes obtaining an image depicting at least one object of interest. The image may be obtained using any image sensor, including, by way of non-limiting example, a visible light camera, an infrared camera, or synthetic aperture radar.

At 304, the method 300 includes passing the image to a first machine learning subsystem, from which at least one feature vector is obtained. The first machine learning subsystem may be implemented as shown and described herein in reference to FIGS. 2A, 2B, and 2C. The first machine learning subsystem may be trained with a first training corpus that includes a set of labeled images. Each labeled image may include an image and an associated label that specifies centroid coordinates and bounding box dimensions for any objects appearing in the image.

At 306, the method 300 includes inputting the feature vector(s) from 204 to a second machine learning subsystem. The second machine learning subsystem may be implemented as shown and described herein in reference to FIGS. 2A, 2B, and 2C. The second machine learning subsystem may be trained with a second training corpus that includes a set of labeled feature vectors. Each labeled feature vector may include a feature vector and associated centroid coordinates and bounding box dimensions. The second machine learning subsystem may be trained based on a loss to provide detected object identification data sets corresponding to input feature vectors. The loss may include (1) a regression loss for object coordinates and object bounding box dimensions, and (2) a Gaussian loss for aleatoric uncertainty. Each detected object identification data set may include, for each detected object: object coordinates, object bounding box dimensions, and dynamic aleatoric uncertainty covariance values. Each detected object identification data set may further include an object classification label. Each dynamic aleatoric uncertainty covariance value may be obtained from a single pass of a feature vector through the second machine learning subsystem. More generally, a single pass of an image through the system may result in a dynamically-updated aleatoric uncertainty covariance value for each tracked object. Each dynamic aleatoric uncertainty covariance value may be summarized by a covariance matrix for respective object coordinates and respective object bounding box dimensions.

At 308, the method 300 includes providing at least one detected object identification data set, output from the second machine learning subsystem in response to the inputting of 306, to a recursive Bayesian estimator subsystem, from which at least one filtered set of object coordinates is obtained. The Bayesian estimator subsystem may be implemented as shown and described herein in reference to FIGS. 2A, 2B, and 2C. The recursive Bayesian estimator subsystem may assign a detected object identification data set to each Bayesian estimator, which extracts a corresponding filtered set of object coordinates. Each Bayesian estimator may also extract corresponding bounding box dimensions. Each Bayesian estimator may include a Kalman filter instantiation, by way of non-limiting example. Each filtered set of object coordinates represents a real-time location of an object of interest.

At 310, the method 300 includes outputting a filtered set of object coordinates for each tracked object. The filtered set of object coordinates may be output according to a representative display on a monitor, which may include an icon or other indicia for each associated class label, or may be output to a different system, such as a control or navigation system. According to some embodiments, filtered object bounding box dimensions may also be output.

Thus, some embodiments predict full dynamic aleatoric uncertainty covariance values for the outputs of an object detector, which provides improved object tracking in comparison to techniques that utilize variance or static covariance. According to some embodiments, a Gaussian loss function is added at the regression head of a single-stage object detector, which augments the object detector by providing an aleatoric uncertainty covariance matrix for object coordinates and bounding box dimensions. The uncertainty is provided in addition to the other outputs, including object coordinates, bounding box dimensions, and class labels. Use of the Gaussian loss trains some embodiments to output a 4×4 dynamic aleatoric uncertainty covariance matrix for the four parameters that define an object bounding box. Some embodiments provide a direct, stable, and computationally efficient way to predict aleatoric uncertainty for the outputs of an object detector in a single forward pass, which provides direct benefits in computationally restricted environments and on low-Size, Weight, and Power (SWaP) hardware.

Certain examples can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), flash memory, and magnetic or optical disks or tapes.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented using computer readable program instructions that are executed by an electronic processor.

These computer readable program instructions may be provided to a processor of a general-purpose computer, special purpose computer, or other programmable data processing apparatus to produce a machine, such that the instructions, which execute via the electronic processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on a user's computer, partly on the user's computer, as a stand-alone software package, partly on the user's computer and partly on a remote computer or entirely on the remote computer or server.

As used herein, the terms "A or B" and "A and/or B" are intended to encompass A, B, or {A and B}. Further, the terms "A, B, or C" and "A, B, and/or C" are intended to encompass single items, pairs of items, or all items, that is, all of: A, B, C, {A and B}, {A and C}, {B and C}, and {A and B and C}. The term "or" as used herein means "and/or."

As used herein, language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

While the invention has been described with reference to the exemplary examples thereof, those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of aerial vehicle tracking using dynamic aleatoric uncertainty covariance estimation, the method comprising:

obtaining an image depicting at least one aerial vehicle of interest;

passing the image to a first machine learning subsystem, from which at least one feature vector is obtained, wherein the first machine learning subsystem is trained with a first training corpus comprising a set of labeled images, wherein a respective labeled image comprises a respective image and a respective label;

inputting the at least one feature vector to a second machine learning subsystem, wherein the second machine learning subsystem is trained with a second training corpus comprising a set of labeled feature vectors, wherein a respective labeled feature vector comprises a respective feature vector, respective centroid coordinates, and respective bounding box dimensions, wherein the second machine learning subsystem is trained based on a loss to provide detected aerial vehicle identification data sets corresponding to input feature vectors, wherein the loss comprises (1) a regression loss for aerial vehicle coordinates and aerial vehicle bounding box dimensions, and (2) a Gaussian loss for aleatoric uncertainty, and wherein a respective detected aerial vehicle identification data set comprises: respective aerial vehicle coordinates, respective aerial vehicle bounding box dimensions, and respective dynamic aleatoric uncertainty covariance values;

providing at least one detected aerial vehicle identification data set, output from the second machine learning subsystem in response to the inputting, to a recursive Bayesian estimator subsystem, from which at least one filtered set of aerial vehicle coordinates is obtained, wherein the recursive Bayesian estimator subsystem assigns a respective detected aerial vehicle identification data set to a respective Bayesian estimator, from which a respective filtered set of aerial vehicle coordinates is obtained, wherein a respective filtered set of aerial vehicle coordinates represent a real-time location of a respective aerial vehicle of interest; and outputting the at least one filtered set of aerial vehicle coordinates.

2. The method of claim 1, wherein respective dynamic aleatoric uncertainty covariance values are obtained from a single pass of a respective feature vector through the second machine learning subsystem.

3. The method of claim 1, wherein respective dynamic aleatoric uncertainty covariance values comprise at least one of: a respective covariance matrix for respective aerial vehicle coordinates, or respective aerial vehicle bounding box dimensions.

4. The method of claim 1, wherein the second machine learning subsystem comprises a multivariate deep evidential regression network.

5. The method of claim 1, wherein the Gaussian loss comprises a trace of a log-Cholesky decomposition of a matrix representing dynamic aleatoric uncertainty covariance values.

6. The method of claim 1, wherein a respective detected aerial vehicle identification data set further comprises an aerial vehicle classification label.

7. The method of claim 1, wherein a respective Bayesian estimator comprises a respective Kalman filter.

8. The method of claim 7, wherein the recursive Bayesian estimator subsystem is configured to provide a respective Kalman filter for each of a plurality of aerial vehicles of interest detected in the image.

9. The method of claim 1, wherein the first machine learning subsystem comprises a convolutional neural network and a multiscale feature decoder.

10. The method of claim 1, wherein respective filtered aerial vehicle bounding box dimensions are obtained from the respective Bayesian estimator, and wherein the outputting further comprises outputting at least one set of filtered aerial vehicle bounding box dimensions.

11. A system for aerial vehicle tracking using dynamic aleatoric uncertainty covariance estimation, the system comprising: a non-transitory computer readable medium comprising instructions; and at least one electronic processor that executes the instructions to perform operations comprising:

obtaining an image depicting at least one aerial vehicle of interest;

passing the image to a first machine learning subsystem, from which at least one feature vector is obtained, wherein the first machine learning subsystem is trained with a first training corpus comprising a set of labeled images, wherein a respective labeled image comprises a respective image and a respective label;

inputting the at least one feature vector to a second machine learning subsystem, wherein the second machine learning subsystem is trained with a second training corpus comprising a set of labeled feature vectors, wherein a respective labeled feature vector comprises a respective feature vector, respective centroid coordinates, and respective bounding box dimensions, wherein the second machine learning subsystem is trained based on a loss to provide detected aerial vehicle identification data sets corresponding to input feature vectors, wherein the loss comprises (1) a regression loss for aerial vehicle coordinates and aerial vehicle bounding box dimensions, and (2) a Gaussian loss for aleatoric uncertainty, and wherein a respective detected aerial vehicle identification data set comprises: respective aerial vehicle coordinates, respective aerial vehicle bounding box dimensions, and respective dynamic aleatoric uncertainty covariance values;

providing at least one detected aerial vehicle identification data set, output from the second machine learning subsystem in response to the inputting, to a recursive Bayesian estimator subsystem, from which at least one filtered set of aerial vehicle coordinates is obtained, wherein the recursive Bayesian estimator subsystem assigns a respective detected aerial vehicle identification data set to a respective Bayesian estimator, from which a respective filtered set of aerial vehicle coordinates is obtained, wherein a respective filtered set of aerial vehicle coordinates represent a real-time location of a respective aerial vehicle of interest; and outputting the at least one filtered set of aerial vehicle coordinates.

12. The system of claim 11, wherein respective dynamic aleatoric uncertainty covariance values are obtained from a single pass of a respective feature vector through the second machine learning subsystem.

13. The system of claim 11, wherein respective dynamic aleatoric uncertainty covariance values comprise at least one of: a respective covariance matrix for respective aerial vehicle coordinates, or respective aerial vehicle bounding box dimensions.

14. The system of claim 11, wherein the second machine learning subsystem comprises a multivariate deep evidential regression network.

15. The system of claim 11, wherein the Gaussian loss comprises a trace of a log-Cholesky decomposition of a matrix representing dynamic aleatoric uncertainty covariance values.

16. The system of claim 11, wherein a respective detected aerial vehicle identification data set further comprises an aerial vehicle classification label.

17. The system of claim 11, wherein a respective Bayesian estimator comprises a respective Kalman filter.

18. The system of claim 17, wherein the recursive Bayesian estimator subsystem is configured to provide a respective Kalman filter for each of a plurality of aerial vehicles of interest detected in the image.

19. The system of claim 11, wherein the first machine learning subsystem comprises a convolutional neural network and a multiscale feature decoder.

20. The system of claim 11, wherein respective filtered aerial vehicle bounding box dimensions are obtained from the respective Bayesian estimator, and wherein the outputting further comprises outputting at least one set of filtered aerial vehicle bounding box dimensions.

\* \* \* \* \*